United States Patent
Rae et al.

(10) Patent No.: US 9,589,322 B2
(45) Date of Patent: *Mar. 7, 2017

(54) IDENTIFYING REGIONS CHARACTERIZED BY LABELED MEASUREMENTS

(71) Applicant: Yahoo! Inc., Sunnyvale, CA (US)

(72) Inventors: Adam Rae, Barcelona (ES); Bart Thomee, Barcelona (ES)

(73) Assignee: Yahoo! Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/954,541

(22) Filed: Nov. 30, 2015

(65) Prior Publication Data

US 2016/0086310 A1    Mar. 24, 2016

Related U.S. Application Data

(62) Division of application No. 13/844,760, filed on Mar. 15, 2013, now Pat. No. 9,235,890.

(51) Int. Cl.
    *G06K 9/00* (2006.01)
    *G06T 3/40* (2006.01)
    *G06T 7/00* (2006.01)
    *G06K 9/46* (2006.01)
    (Continued)

(52) U.S. Cl.
    CPC .......... *G06T 3/4038* (2013.01); *G06K 9/4642* (2013.01); *G06T 5/002* (2013.01); *G06T 5/40* (2013.01); *G06T 7/0012* (2013.01); *G06T 7/0083* (2013.01); *G06T 2207/20016* (2013.01); *G06T 2207/30004* (2013.01); *G06T 2207/30181* (2013.01)

(58) Field of Classification Search
    CPC ......... G06T 7/0012; G06T 2207/30004; G06T 2207/20016
    See application file for complete search history.

(56) References Cited

U.S. PATENT DOCUMENTS

| 7,227,893 | B1 | 6/2007 | Srinivasa et al. |
| 7,405,740 | B1 * | 7/2008 | Neugebauer .......... G06T 3/4007 345/667 |
| 9,235,890 | B2 | 1/2016 | Rae |

(Continued)

FOREIGN PATENT DOCUMENTS

GB    2483787    3/2012

OTHER PUBLICATIONS

Koenderink, "The Structure of Images," Biological Cybernetics, vol. 50, pp. 363-370, Nov. 1984.
(Continued)

*Primary Examiner* — Li Liu
(74) *Attorney, Agent, or Firm* — Berkeley Law & Technology Group, LLP

(57) ABSTRACT

Briefly, the disclosure describes embodiments of methods or apparatuses for processing, such as smoothing, a set of labeled measurements at a variety of scale levels. In one or more non-limiting embodiments purely for illustrative purposes, relatively fine details of labeled measurements may be displayed utilizing a relatively low-scale map, such as a map showing individual towns and/or villages. For display utilizing a relatively higher scale map, such as a map showing larger geopolitical areas, for example, relatively fine details may be omitted.

20 Claims, 4 Drawing Sheets

(51) Int. Cl.
*G06T 5/00* (2006.01)
*G06T 5/40* (2006.01)

(56) References Cited

U.S. PATENT DOCUMENTS

| | | | |
|---|---|---|---|
| 2007/0036432 A1 | 2/2007 | Xu et al. | |
| 2008/0192998 A1 | 8/2008 | Takeguchi et al. | |
| 2011/0150324 A1* | 6/2011 | Ngan | G06K 9/00704 382/159 |
| 2011/0243438 A1 | 10/2011 | Hoppe et al. | |
| 2011/0311129 A1 | 12/2011 | Milanfar et al. | |
| 2012/0057759 A1* | 3/2012 | Yonaha | G06T 7/0042 382/107 |
| 2012/0328161 A1* | 12/2012 | Palenychka | G06K 9/00771 382/107 |
| 2013/0121546 A1* | 5/2013 | Guissin | G06T 7/0012 382/128 |
| 2013/0230230 A1 | 9/2013 | Ajemba et al. | |
| 2014/0119656 A1 | 5/2014 | Lilje et al. | |

OTHER PUBLICATIONS

Lindeberg, "Detecting Salient Blob-Like Image Structures and Their Scales with a Scale-Space Primal Sketch: A Method for Focus of Attention," International Journal of Computer Vision, vol. 11, No. 3, pp. 283-318, Aug. 1993.

Lindeberg, "Linear Spatio-Temporal Scale-Space," Scale-Space Theory in Computer Vision, pp. 113-127, Nov. 2001.

Lindeberg, "Scale-space theory: A basic tool for analysing structures at different scales," Journal of Applied Statistics, vol. 21, No. 2, pp. 225-270, Mar. 1994.

Lindeberg, et al, "Scale Detection and Region Extraction from a Scale-Space Primal Sketch," Proceedings of the 3rd IEEE International Conference on Computer Vision, pp. 416-426, Apr. 1990.

Lowe, "Distinctive Image Features from Scale-Invariant Keypoints," Springer International Journal of Computer Vision, vol. 60, No. 2, pp. 91-110, Jul. 2004.

Lowe, David G. "Object recognition from local scale-invariant features." Computer vision, 1999. The proceedings of the seventh IEEE international conference on. vol. 2.

Thomee, et al, "Exploring and Browsing Photos through Characteristic Geographic Tag Regions," MM' 12, Oct. 29-Nov. 2, 2012, Nara, Japan, 2 pages.

Weickert, et al, "Linear Scale-Space has First been Proposed in Japan," Journal of Mathematical Imaging and Vision, vol. 10, No. 3, pp. 237-252, Apr. 1999.

Witkin, "Scale-Space Filtering," Proceedings of the 1984 IEEE International Conference on Acoustics, Speech, and Signal Processing, vol. 9, pp. 150-153, Dec. 1984.

U.S. Appl. No. 13/844,760, filed Mar. 15, 2013, 69 pages.
U.S. Appl. No. 13/844,760: Filing Receipt, May 17, 2013, 3 pages.
U.S. Appl. No. 13/844,760: Notice of Publication, Sep. 18, 2014, 1 page.
U.S. Appl. No. 13/844,760: Requirement for Restriction/Election, Oct. 8, 2014, 6 pages.
U.S. Appl. No. 13/844,760: Response to Election/Restriction, Dec. 8, 2014, 8 pages.
U.S. Appl. No. 13/844,760: Non-Final Rejection, Jan. 20, 2015, 8 pages.
U.S. Appl. No. 13/844,760: Amendment/Req. Reconsideration—After Non-Final Rejection, Apr. 20, 2015, 14 pages.
U.S. Appl. No. 13/844,760: Final Rejection, May 8, 2015, 7 pages.
U.S. Appl. No. 13/844,760: Response After Final Action, Jul. 8, 2015, 13 pages.
U.S. Appl. No. 13/844,760: RCE and Amendments, Aug. 10, 2015, 13 pages.
U.S. Appl. No. 13/844,760: Notice of Allowance and Fees Due, Sep. 10, 2015, 8 pages.
U.S. Appl. No. 13/844,760: Amendment after Notice of Allowance, Oct. 14, 2015, 4 pages.
U.S. Appl. No. 13/844,760: Issue Fee Payment, Nov. 30, 2015, 1 page.
U.S. Appl. No. 13/844,760: Issue Notification, Dec. 22, 2015, 1 page.

* cited by examiner 1.0 cm = 1000.0 km 1 cm = 300.0 km 1 cm = 150.0 km

IDENTIFYING REGIONS CHARACTERIZED BY LABELED MEASUREMENTS

CROSS-REFERENCE TO RELATED APPLICATIONS

Although claimed subject matter is not necessarily limited in scope in this respect, additional example embodiments of IDENTIFYING REGIONS CHARACTERIZED BY LABELED MEASUREMENTS may be discussed in concurrently filed U.S. patent application Ser. No. 13/815,833, titled VISUALIZING REGIONS CHARACTERIZED BY LABELED MEASUREMENTS, by Bart Thomee, et al, herein incorporated by reference in its entirety and assigned to the assignee of currently claimed subject matter and in concurrently filed U.S. patent application Ser. No. 13/844,637, (now U.S. Pat. No. 9,058,666) titled FORMING REGIONS CHARACTERIZED BY LABELED MEASUREMENTS by Bart Thomee, et al. herein incorporated by reference in its entirety and assigned to the assignee of currently claimed subject matter, application Ser. No. 13/844,760.

BACKGROUND

1. Field

This disclosure relates to processing labeled measurements using smoothing functions to create a visual representation of a region identified by the labeled measurements.

2. Information

In many applications, it may be useful to display measurements using computer-assisted graphics to display measurements in a manner that may be more easily interpreted by, for example, researchers, scientists, investigators, students, and/or others. For example, a medical researcher investigating the spread of an illness or disease across a region, may find that computer-assisted images representing the geographical distribution of the illness or disease may be a useful tool in determining locations at which disease-fighting resources may be positioned. Such positioning may facilitate, for example, more efficient and/or effective deployment of healthcare assets in a manner that may reduce incidence of cases of affliction as well as increase an ability to treat those already afflicted.

In another example in which display of computer-assisted graphics may be useful, a social sciences researcher may study measurements of labels associated with photographs in a database in an effort to study regional and/or national trends. In one possible example, trends among certain age groups may be evaluated by studying types of photographs taken by individuals of certain age groups and/or locations at which photographic images are captured, for example. This research may be used, for example, to uncover factors contributing to trends so that, for example, ramifications of elections, political and/or economic decisions, etc., may be better understood. To facilitate investigation, computer-generated graphics, for example, may be used to assist a researcher in visualizing trends and/or assessing how trends may propagate within a society, region, nation, etc.

Unfortunately, contemporary computer visualization tool sets may not be capable of assisting in epidemiological or social sciences investigations, for example. Thus, various types of epidemiology and/or social science research may be hindered by an inability to comprehensively and/or accurately visualize various phenomena. Researchers, for example, may be constrained to using less-effective and/or manual tools, which may be slow and/or cumbersome to manipulate. Further, communication of results of investigations to an audience, perhaps by way of computer-assisted imagery, may be less effective or even impaired. This may, for example, lessen the benefit of conducting the investigation.

BRIEF DESCRIPTION OF DRAWINGS

Claimed subject matter is particularly pointed out and distinctly claimed in the concluding portion of the specification. However, both as to organization and/or method of operation, together with objects, features, and/or advantages thereof, claimed subject matter may be understood by reference to the following detailed description if read with the accompanying drawings in which:

Figure 1A:
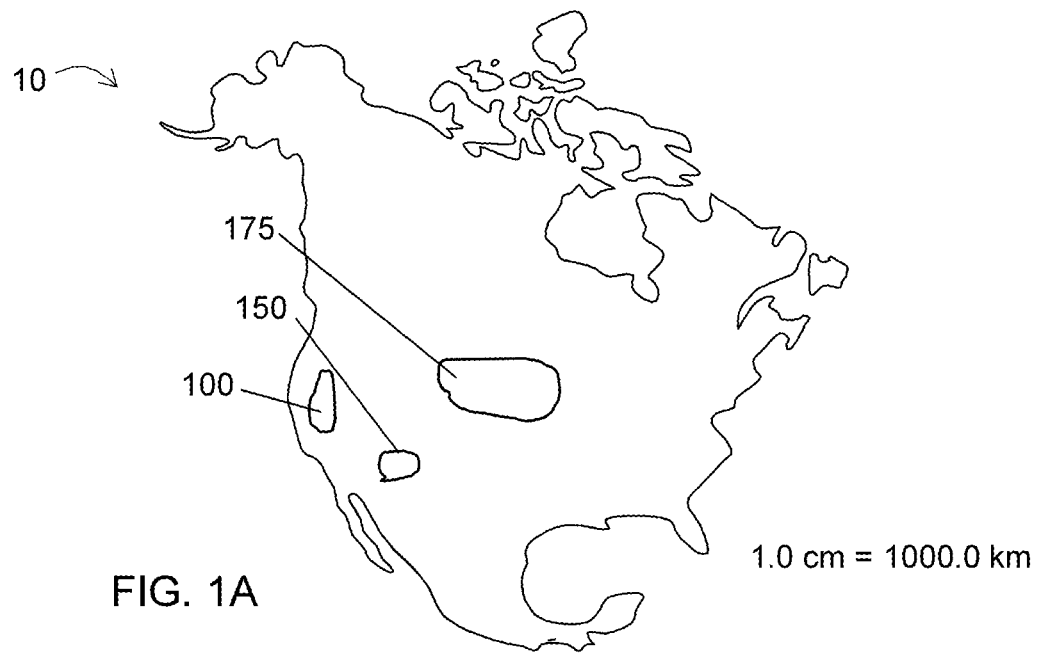
FIGS. 1A-1C are diagrams identifying one or more regions within a geographical area characterized by labeled measurements according to an embodiment.

Reference is made in the following detailed description to accompanying drawings, which form a part hereof, wherein like numerals may designate like parts throughout to indicate corresponding and/or analogous components. It will be appreciated that components illustrated in the figures are not necessarily drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

In the following detailed description, numerous specific details are set forth to provide a thorough understanding of claimed subject matter. For purposes of explanation, specific numbers, systems, and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes, and/or equivalents may occur to those skilled in the art. It is, therefore, to be understood that appended claims are intended to cover any and all modifications and/or changes as fall within claimed subject matter.

Reference throughout this specification to one implementation, an implementation, one embodiment, an embodiment and/or the like may mean that a particular feature, structure, or characteristic described in connection with a particular implementation or embodiment may be included in at least one implementation or embodiment of claimed subject matter. Thus, appearances of such phrases, for example, in various places throughout this specification are not necessarily intended to refer to the same implementation or to any one particular implementation described. Furthermore, it is to be understood that particular features, structures, or characteristics described may be combined in various ways in one or more implementations. In general, of course, these and other issues may vary with context. Therefore, particular context of description or usage may provide helpful guidance regarding inferences to be drawn.

Operations and/or processing, such as in association with networks, such as communication networks, for example, may involve physical manipulations of physical quantities. Typically, although not necessarily, these quantities may take the form of electrical and/or magnetic signals capable of, for example, being stored, transferred, combined, processed, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these or similar terms are to be associated with appropriate physical quantities and are intended to merely be convenient labels.

Likewise, in this context, the terms "coupled", "connected," and/or similar terms, may be used. It should be understood that these terms are not intended as synonyms. Rather, "connected" may be used to indicate that two or more elements or other components, for example, are in direct physical and/or electrical contact; while, "coupled" may mean that two or more components are in direct physical or electrical contact; however, "coupled" may also mean that two or more components are not in direct contact, but may nonetheless co-operate or interact. The term coupled may also be understood to mean indirectly connected, for example, in an appropriate context.

The terms, "and", "or", "and/or" and/or similar terms, as used herein, may include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms may be used to describe any feature, structure, and/or characteristic in the singular and/or may be used to describe a plurality or some other combination of features, structures and/or characteristics. Though, it should be noted that this is merely an illustrative example and claimed subject matter is not limited to this example. Again, particular context of description or usage may provide helpful guidance regarding inferences to be drawn.

It should be understood that for ease of description a network device may be embodied and/or described in terms of a computing device. However, it should further be understood that this description should in no way be construed that claimed subject matter is limited to one embodiment, such as a computing device or a network device, and, instead, may be embodied as a variety of devices or combinations thereof, including, for example, one or more illustrative examples.

In this context, the term network device refers to any device capable of communicating via and/or as part of a network. Network devices may be capable of sending and/or receiving signals (e.g., signal packets), such as via a wired or wireless network, may be capable of performing arithmetic and/or logic operations, processing and/or storing signals, such as in memory as physical memory states, and/or may, for example, operate as a server. Network devices capable of operating as a server, or otherwise, may include, as examples, dedicated rack-mounted servers, desktop computers, laptop computers, set top boxes, tablets, netbooks, smart phones, integrated devices combining two or more features of the foregoing devices, the like or any combination thereof.

A network may comprise two or more network devices and/or may couple network devices so that signal communications, such as in the form of signal packets, for example, may be exchanged, such as between a server and a client device and/or other types of network devices, including between wireless devices coupled via a wireless network, for example. It is noted that the terms, server, server device, server-computing device, server-computing platform, and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices or one or more server devices, as appropriate. Along similar lines, references to a "database" are understood to mean, one or more databases and/or portions thereof, as appropriate.

A network may also include now known, or to be later developed arrangements, derivatives, and/or improvements, including, for example, past, present and/or future mass storage, such as network attached storage (NAS), a storage area network (SAN), and/or other forms of computer and/or machine readable media, for example. A network may include the Internet, one or more local area networks (LANs), one or more wide area networks (WANs), wire-line type connections, wireless type connections, other connections, and/or any combination thereof. Thus, a network may be worldwide in scope and/or extent. Likewise, sub-networks, such as may employ differing architectures or may be compliant and/or compatible with differing protocols, such as communication protocols (e.g., network communication protocols), may interoperate within a larger network. Various types of devices may be made available so that device interoperability is enabled and/or, in at least some instances, may be transparent to the devices. In this context, the term transparent refers to communicating in a manner so that communications may pass through intermediaries, but without the communications necessarily specifying one or more intermediaries, such as intermediate devices, and/or may include communicating as if intermediaries, such as intermediate devices, are not necessarily involved. For example, a router may provide a link between otherwise separate and/or independent LANs. In this context, a private network refers to a particular, limited set of network devices able to communicate with other network devices in the particular, limited set, such as via signal packet transmissions, for example, without a need for re-routing and/or redirecting such communications. A private network may comprise a stand-alone network; however, a private network may also comprise a subset of a larger network, such as, for example, without limitation, the Internet. Thus, for example, a private network "in the cloud" may refer to a private network that comprises a subset of the Internet, for example. Although signal packet transmissions may employ intermediate devices to exchange signal packet transmissions, those intermediate devices may not necessarily be included in the private network by not being a source or destination for one or more signal packet transmissions, for example. As another example, a logical broadcast domain may comprise an example of a private network. It is understood in this context that a private network may provide outgoing communications to devices not in the private network, but such devices outside the private network may not direct inbound communications to devices included in the private network.

The Internet refers to a decentralized global network of interoperable networks, including devices that are part of those interoperable networks. The Internet includes local area networks (LANs), wide area networks (WANs), wireless networks, and/or long haul public networks that, for example, may allow signal packets to be communicated between LANs. The term world wide web (WWW) and/or similar terms may also be used to refer to the Internet. Signal packets, also referred to as signal packet transmissions, may be communicated between nodes of a network, where a node may comprise one or more network devices, for example. As an illustrative example, but without limitation, a node may comprise one or more sites employing a local network address. Likewise a device, such as a network device, may be associated with that node. A signal packet may, for example, be communicated via a communication channel or a communication path comprising the Internet, from a site via an access node coupled to the Internet. Likewise, a signal packet may be forwarded via network nodes to a target site coupled to a local network, for example. A signal packet communicated via the Internet, for example, may be routed via a path comprising one or more gateways, servers, etc. that may, for example, route a signal packet in accordance with a target address and availability of a network path of network nodes to a target address.

Physically connecting portions of a network via a hardware bridge, as one example, may be done, although other approaches also exist. A hardware bridge, however, may not typically include a capability of interoperability via higher levels of a network protocol. A network protocol refers to a set of signaling conventions for communications between or among devices in a network, typically network devices, but may include computing devices, as previously discussed; for example, devices that substantially comply with the protocol or that are substantially compatible with the protocol. In this context, the term "between" and/or similar terms are understood to include "among" if appropriate for the particular usage. Likewise, in this context, the terms "compatible with", "comply with" and/or similar terms are understood to include substantial compliance or substantial compatibility. Typically, a network protocol has several layers. These layers may be referred to here as a communication stack. Various types of communications may occur across various layers. For example, as one moves higher in a communication stack, additional functions may be available by transmitting communications that are compatible and/or compliant with a particular network protocol at these higher layers.

In contrast, a virtual private network (VPN) may enable a remote device to communicate via a local network. A router may allow communications in the form of transmissions (e.g., signal packets), for example, to occur from a remote device to a VPN server on a local network. A remote device may be authenticated and a VPN server, for example, may create a special route between a local network and the remote device through an intervening router.

A network may be very large, such as comprising thousands of nodes, millions of nodes, billions of nodes, or more, as examples. Media networks, such as the Yahoo!™ network, for example, are increasingly seeking ways to keep users within their networks by providing features and/or tool sets that users may find useful. A media network may, for example, comprise an Internet website or group of websites having one or more sections appealing to different interests or aspects of a user's experience, for example. For instance, the Yahoo!™ network includes websites located within different categorized sections, such as sports, finance, photo sharing (e.g., Flickr™) current events, and/or games, to name just a few among possible non-limiting examples.

The more users remaining within a media network for an extended period, the more valuable a network may become to potential advertisers. Thus, the more money advertisers may be inclined to pay to advertise to users, for example, via that media network. In an implementation, for example, an online photo sharing site, such as the Yahoo!™ Flickr™ service, may enable a user to share photographs among a vast community of contacts and/or other users, via a server or other type of computing platform. In particular implementations, photographic assets, such as pictures, video clips, multimedia clips, or other images, may be associated with one or more labels, such as assigned by a user, so that other users of an online service may access an image or other photographic asset of potential interest. Use of online photo sharing services may enable a user to keep up with friends and/or acquaintances, explore portions of the world with which they may be unfamiliar, and/or investigate localized areas, regions, and/or entire countries for future travel, just to name a few non-limiting examples. For example, if a user is interested in traveling to Italy, a user may search an online photo sharing service for images having a label, such as "Italy," or may be associated with locations, such as within the Italian peninsula. Although claimed subject matter is, of course, not limited in this respect, an implementation, such as online photo sharing services, may entice users to remain within a network for a relatively extended period.

In an implementation, a media network may serve as a collection point for "labeled measurements" that may be associated with one or more locations, such as a geographical location, for example. However, labeled measurements need not be restricted to points that represent physical locations on the surface of the Earth, for example. In other implementations, a measurement may be associated with a non-spatial physical manifestation, that may, for example, be represent as one or more coordinate points, such as in a multidimensional vector space, a signal space, or another domain that may be employed to represent one or more features of a measurable physical manifestation. For example, a frequency domain or a wavelength domain as simply one example, may be employed. Within a given space, points, lines, and/or surfaces may be represented using a linear combination of a set of mutually orthogonal vectors that span the space, although, again, this is simply a non-limiting example. It should be noted that claimed subject matter is intended to embrace all domains capable of representing a measurable physical manifestation, whether in two dimensions, three dimensions, and/or additional dimensions.

In an implementation, as another example, a labeled measurement may comprise one or more physical states (e.g., memory states) to encode light levels of various wavelengths in an image capture device (e.g., camera). Thus, for example, a labeled measurement may represent an image captured and stored as a JPEG, TIFF, or other type of physical state and may be associated with an approximate location on the Earth at which an image was captured.

Accordingly, a labeled measurement may include a photograph, video clip, and/or other multimedia segment, just to name a few examples. Of course, again, claimed subject matter is not limited to illustrative examples.

In another implementation example, a labeled measurement may comprise an arrangement of one or more physical states (e.g., memory states) to encode, for example, a date and/or a location of a meeting, a date and/or location of a social event, such as a parade, a party, or other festivity, etc. A labeled measurement may comprise a report of a discrete event, such as a measurement of a snow level at a location at a certain time or a location and time of an incidence of a disease or illness, just to name a few examples. A labeled measurement may be associated with a location larger than a single point, such as a relatively small area, such as 1.0 square kilometer or less, or may be associated with events distributed over a much larger region, such as a country, continent, or other landmass. Again, claimed subject matter is not limited to illustrative example. Thus, a labeled measurement may also represent a summation or other aggregation of measurements, such as, for example, an indication of snowfall measurements extracted from various points located on mountain, an entire mountain resort, or across a mountainous region. Accordingly, claimed subject matter is intended to embrace identifying labeled measurements comprising any number of arrangements of physical states, for example, that may encode measurements that may be useful and/or of interest.

According to one or more implementations, as discussed herein, labeled measurements may be assigned a label corresponding to a name of a city, such as San Francisco, Los Angeles, Madrid, or the like. A label may also comprise a name of an establishment, such as the Golden Gate Bridge, Fenway Park, and so forth; a name of a naturally occurring feature, such as the Grand Canyon, Yellowstone National Park, and so forth; or may include any other identifier. Labels may also comprise any other descriptive references, such as clouds, sunsets, beaches, parks, countries, names of individuals or groups, and/or a large variety of other descriptors that may be useful in categorizing a labeled measurement. It should be noted that claimed subject matter is contemplated as embracing all types of labels that may be assigned to measurements and all types of physical locations or abstracted locations within mathematical or vector spaces associated with such measurements, for example.

In an implementation, a computing device, for example, may receive and/or access labeled measurements stored in memory. In certain implementations, a computing device, for example, may construct a two-dimensional histogram comprising a number of bins, which may correspond to, for example, an area encompassed by 0.01° latitude and/or 0.01° longitude on the surface of the Earth. In other implementations, smaller discretizations of latitude and/or longitude other than 0.01° are possible as well as larger discretizations, such as 0.02°. Again, these are illustrations and claimed subject matter is not intended to be limited to illustrations. Therefore, other discretizations may be employed. Thus, in one possible example, of which many examples are possible, labeled measurements of a particular bin may be assigned or associated with corresponding label(s) nearest (e.g., within) 0.01° latitude and/or 0.01° longitude on the surface of the Earth. In other possible examples, discretizations pertaining to non-georeferenced labeled measurement bins may correspond, for example, to dimensions measured in nanometers, kilometers, miles, acres, and so forth. Non-georeferenced labeled measurements may correspond to dimensions measured in light years, for example, for extraterrestrial measurements. Discretizations may pertain to a number of pixels in an image, for example. Discretizations may pertain to un-evenly spaced dimensions at least partially resulting from non-linear conversions from labeled measurements (e.g. self-organizing feature maps trained using unsupervised learning). Again, these represent only a few examples of a myriad of possible examples, and claimed subject matter is not limited in this respect.

In an implementation, a representation of at least one identified region encompassing locations of measured labels may be exhibited using one or more "layers" on a display. It is noted that the term layer may be associated with a particular scale level out of a variety of possible scale levels. At a given layer, which may represent, for example, a relatively high-resolution representation of a portion of the surface of the earth, a region may be identified by detecting one or more outermost iso-contours that may bound an area within which prominence or conformance of label measurements relative to other label measurements may drop below a threshold level, for example. In this context, the term prominence refers to a characteristic in which some label measurements may tend stand out among a larger set of label measurements. In some implementations, a weighting function that may be applied to labeled measurements to enhance a contribution (e.g. prominence) of some labeled measurements in comparison other labeled measurements Likewise, in this context, the term conformance refers to a characteristic in which some label measurements may tend to be consistent within a larger set of label measurements. To display an identified region covering a larger area, for example, representing a portion of the surface of the Earth at somewhat lower resolution, e.g., another layer or different scale level, a computing device may generate a second histogram. A second histogram may, at least in part, permit a user to increase or to decrease a zoom level in a reasonably consistent manner between a lower resolution layer (e.g., relatively higher scale level) encompassing a relatively large identified region and a higher resolution layer (e.g., relatively lower scale level) encompassing a smaller identified region, for example.

In an implementation, a second layer may be generated using a smoothing process, such as with respect to the previously constructed histogram. A smoothing process may comprise, at least in some implementations, a convolution of a two-dimensional Gaussian kernel with the previously constructed histogram, although other smoothing approaches may be employed. Again, claimed subject matter is not limited to illustrations.

In certain implementations, a set of labeled measurements at a variety of scale levels may be smoothed in a manner that is at least approximately consistent with measurement labels across a variety of scale levels. For example, at a relatively large scale, if a map corresponding to the European continent is displayed, regions that may be identified by way of "country-level" features, such as where Spanish or German citizens are currently located, may be smoothed using a relatively large Gaussian kernel, for example, and displayed. In a somewhat smaller relative scale, encompassing, for example, a single country, (e.g., Spain), regions that may be identified by areas within a country, such as the Spanish regions of Andalusia, Extremadura, or Valencia may be smoothed using a somewhat relatively smaller Gaussian kernel, for example. At still other scale levels, such as at a city or town level, identified regions that may be characterized by labels corresponding to a town square, a mall, or other location within a town may be smoothed using a somewhat relatively smaller Gaussian kernel, for example, and displayed. Claimed subject matter is intended to embrace all instances in which labels associated with measurements may be smoothed in a manner appropriate or consistent with scale levels. In this context, as suggested previously, a relatively high resolution refers to a relatively lower scale and a relatively lower resolution refers to a relatively higher scale.

In accordance with some embodiments, a computing device may filter measurements having labels occurring with less prominence or conformance than other labels. Filtering, which may be implemented differently for different scale levels, as described further herein, may permit display and/or visualization of a level of detail appropriate for a particular layer. In one possible example, a researcher may wish to view an epidemiological map on a national scale. To facilitate viewing at a relatively higher scale level, for example, details that may be useful at a relatively lower level scale level, such as details at a town or village level, for example, may be merged by way of spatial filtering and/or one or more image processing techniques, so that nuances of larger scale phenomena (e.g., intrusion of an epidemic into neighboring countries) that may be of interest may be presented more effectively.

In a particular implementation, a Gaussian smoothing operation may be employed at levels other than a relative high resolution. For example, in an embodiment, measurements providing a highest resolution for a particular set of available measurements may be referred to as a 'zeroth' layer or level. At various subsequent layers, in an embodiment, a Gaussian smoothing function may comprise a kernel, which may, for example, be scaled proportional to a square root of a layer numerical value if the layer value comprises a nonzero value. In some implementations, while smoothing a first layer, a scale factor "a" may be used, wherein a corresponds to a standard deviation of the particular Gaussian kernel at the particular level or layer. Accordingly, at a first layer, a may be scaled to approximately equal 1.0. At a second layer, a may be scaled to approximately equal to the square root of 2.0, or approximately 1.414. Scaling of a to successively higher values to perform smoothing operations at layers other than the zeroth layer may, at least in some implementations, result in fine scale features being reduced, such as at least approximately monotonically, as subsequent layers (e.g., first, second, third, and so forth) are constructed. For example, in an embodiment, roughly equivalent or consistent intervals may be employed between successive layers or levels. Although Gaussian smoothing may be contemplated for at least some implementations, as indicated, other types of smoothing approaches, such as binomial, Savitsky-Golay, and so forth, may be utilized and are included within claimed subject matter. However, use of other types of smoothing approaches may result, at least in part, in an introduction of fine scale features (artifacts) as a smoothing kernel comprises a larger value, for example.

Figure 1B:
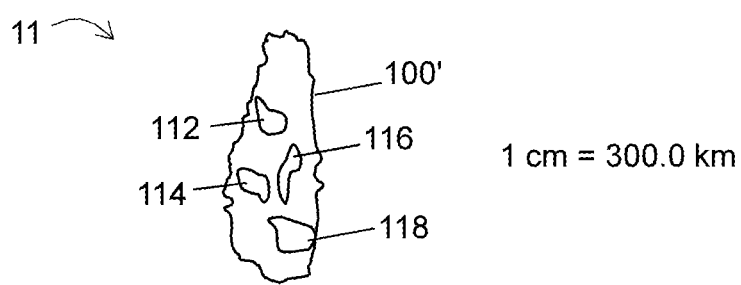
Figure 1C:
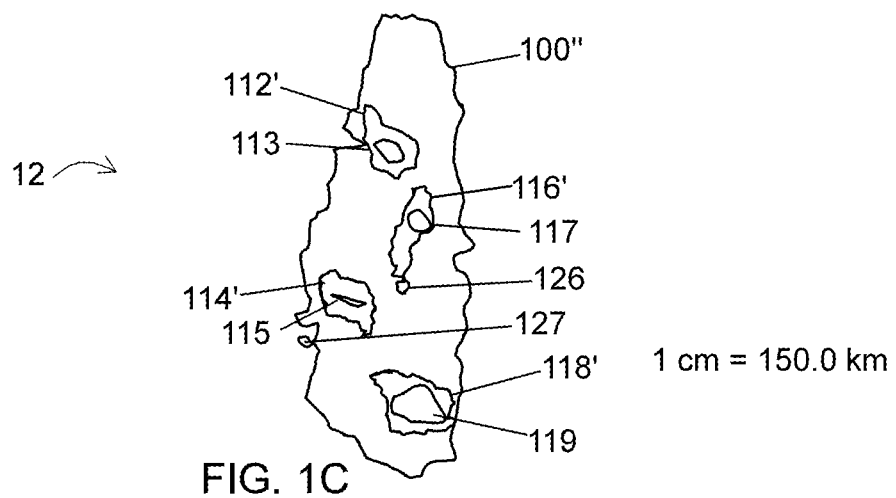

FIGS. 1A-1C are diagrams showing regions within a geographical area identified by labeled measurements according to an embodiment. In FIG. 1A, map 10 represents the North American continent comprising identified regions 100, 150, and 175, wherein a scale of 1.0 cm represents approximately 1000.0 km. Identified region 100 may correspond to, for example, the San Joaquin Valley in California of the western United States. Identified region 150 may correspond to, for example, a portion of the Sonoran Desert in the southwest portion of the United States. Identified region 175 may correspond to, for example, an area of the central plains of the United States.

In one non-limiting example, identified regions 100, 150, and 175 may encompass locations within which a weather event, such as flooding, drought, etc., may be occurring. Accordingly, for the case of a drought, for example, measurements, such as reports of river levels at a given time, underground aquifer levels, mean daytime temperatures at different locations and times, and/or other indicators from locations within identified regions 100, 150, and 175 may be assigned a label corresponding to "drought," for example. However, claimed subject matter is, of course, not limited to the use of particular geographic identified regions, particular weather occurrences within identified regions, particular times, or particular labels assigned to measurements, which are provided as illustrations.

In FIG. 1B, a map 11 showing identified region 100', which may correspond, for example, to the San Joaquin Valley in California, may be seen with greater detail than identified region 100 of FIG. 1A. In FIG. 1B, 1.0 cm represents approximately 300.0 km. Identified regions 112, 114, 116, and 118, which are not visible in identified region 100 of FIG. 1, are visible in FIG. 1B. For the example of FIG. 1B, measurements reported from locations within identified regions 112, 114, 116, and 118 may, for example, describe river levels, underground aquifer levels, and/or other indicators. Labeled measurements associated with locations within these identified regions may be assigned a label corresponding to "severe drought," for example.

In FIG. 1C, identified regions 112', 114', 116', and 118' of a map 12 are visible, for example. In FIG. 1C, 1.0 cm represents approximately 150.0 km. Within identified region 112' of FIG. 1C, identified region 113 is visible. Within identified region 114', identified region 115 is visible. Within identified region 116', identified region 117 is visible. Within identified region 118', identified region 119 is visible. For the example of FIG. 1C, measurements from locations within identified regions 113, 115, 117, and 119 may, for example, describe river levels, underground aquifer levels, and/or other indicators. Measurement labels corresponding to locations from within these identified regions may be assigned a label corresponding to "extreme drought," for example.

From FIGS. 1A, 1B, and 1C and as described herein, visible regions identified by "drought," "severe drought," and/or "extreme drought," for example, for example, may be displayed at a level of resolution consistent with a given scale and/or zoom command from an interface, such as a graphical user interface (GUI). Additionally, identified regions 100, 100', and 100" are shown with increasing detail as resolution increases. For example, identified region 100, as shown in FIG. 1A, may appear to be smoothed in relation to identified region 100' of FIG. 1B. Additionally, identified region 100' of FIG. 1B may appear to be smoothed in relation to identified region 100" of FIG. 1C. Likewise, identified regions 112, 114, 116, and 118 of FIG. 1B may appear smoothed in relation to identified regions 112', 114', 116', and 118', of FIG. 1C. In the example of FIGS. 1A-1, a level of detail appropriate for the particular layer (e.g., 1.0 cm=1000.0 km, for example) may be achieved by smoothing a relatively higher-resolution layer (e.g. 1.0 cm equals 300.0 km), for example.

One or more identified regions displayed in greater detail in a relatively higher resolution layer need not be contiguous to be displayed, as such for a lower resolution layer. For example, in FIG. 1C, identified region 126 is shown as detached from identified region 116'. Similarly, identified region 127 is shown as detached from identified region 100".

However, identified regions 126 and 127 may be incorporated into larger immediately adjacent regions in FIG. 1B, for example. These examples illustrate, for an embodiment, use of one or more image processing techniques, which may include morphological transforms, such as contour tracing, closing, filling, dilation, erosion, or combinations thereof. Image processing techniques may be employed with relatively higher resolution regions in order to display corresponding regions at relatively lower resolutions using an appropriate level of detail, in an embodiment.

Figure 2:
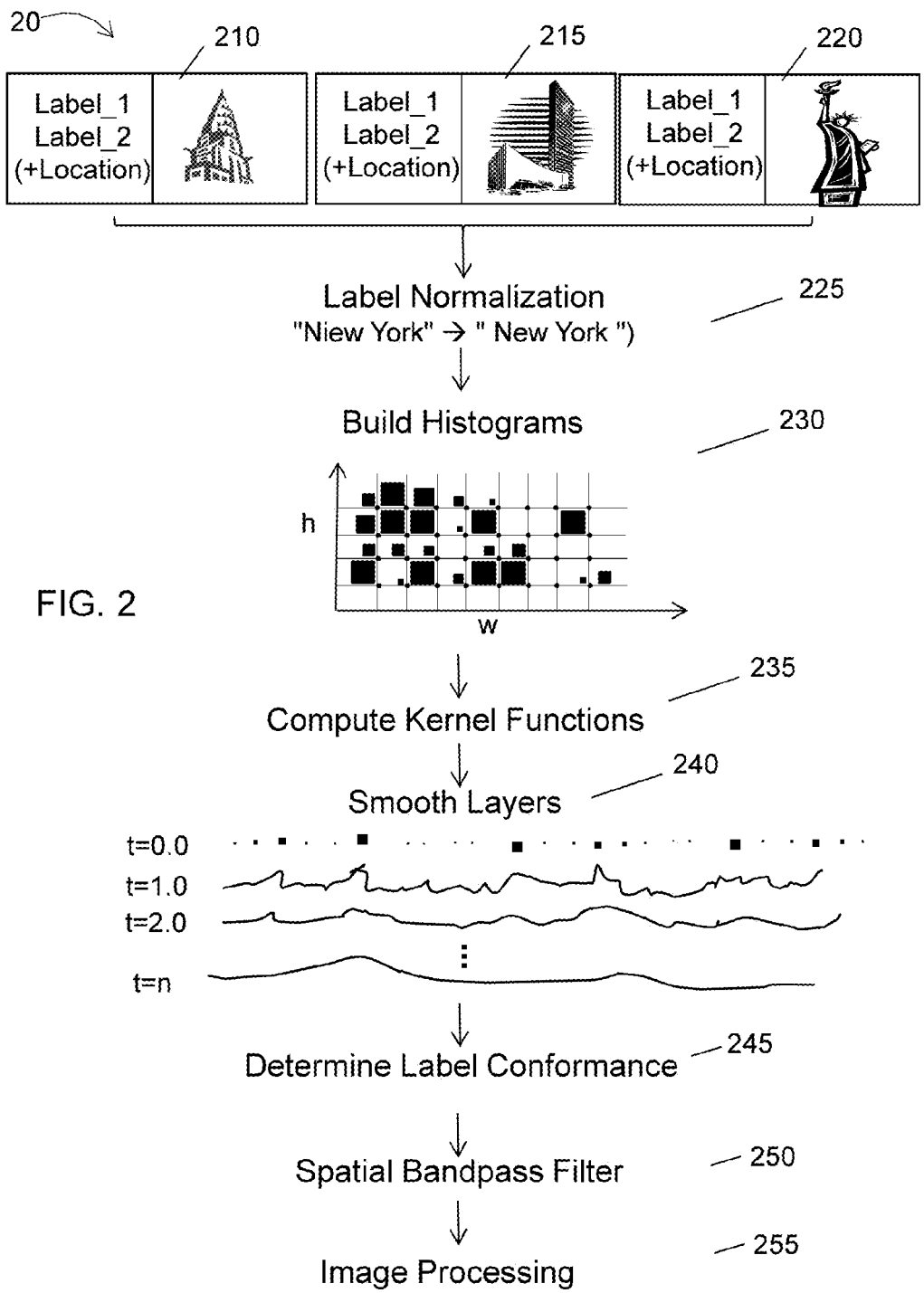
FIG. 2 is a flow diagram of a process for identifying one or more regions characterized by labeled measurements according to an embodiment.

FIG. 2 is a flow diagram of a process for identifying a region characterized by labeled measurements according to an embodiment 20. In FIG. 2, labeled measurements in the form of captured still images of popular attractions in New York City are shown as comprising input signals to process embodiment 20. Although three captured images (210, 215, and 220) are shown, implementations may make use of hundreds, thousands, millions or even more labeled captured images. Further, labeled measurements representing event notices, reports, video clips, audio clips, multimedia segments, and so forth, for example, may also be represented by input signals to process embodiment 20. That is, captured images are provided as a non-limiting example illustration.

Captured images 210, 215, and 220 have been assigned Label_1 and Label_2. Captured images 210, 215, and 220 may be assigned additional labels, which may correspond to a name of an individual capturing the image, a name corresponding to the attraction, (e.g., Chrysler building, United Nations building, Statue of Liberty, and so forth), name of an event, and/or any other label, as examples, and claimed subject matter is not limited in this respect. For the purposes of discussion of FIG. 2, Label_1 may be assumed to be text, such as "New York" or, for example, a slightly misspelled version, such as "Niew York."

As shown in FIG. 2, captured images 210, 215, and 220 may additionally be associated with a measurement corresponding to, for example, a location at which the image was captured. For the example of FIG. 2, location may also correspond to latitude and/or longitude at which a photographic image was captured. However, locations may be expressed in other forms, such as street addresses, well-known establishments, such as Yankee Stadium, or any other technique of expressing a location in a reasonably unambiguous manner, and claimed subject matter is not limited in this respect.

Process embodiment 20 of FIG. 2 begins at 225, wherein normalization of labels assigned to captured images may take place. For example, a slight misspelling of "New York," such as as "Niew York," may be corrected. In implementations, normalization may comprise other operations such as translation from one language to another, as may be encountered if one or more captured images is assigned a label, for example, "Park" (in English), "Parc" (in French), and "Parque" (in Spanish). In certain implementations, normalization may also involve removal of diacritical marks, for example, present in a first language but not present in a second language. For example, measurements assigned a label corresponding to "España" (in Spanish) may be normalized to "Spain" in English. It should be noted that many types of translations from a first language to a second language are possible, as well as transliteration from a first character set to a second character set may be possible of being performed at 225, and claimed subject matter is intended to embrace all such occurrences or embodiments.

Normalization at 225 may also be expressed in mathematical terms. In particular implementations, given a set of labels, denoted as "Λ," a measurement collection may be described as $D_\Lambda = \cup$ of $D|\lambda\epsilon\Lambda$, wherein the "∪" symbol indicates a union of various labeled measurements, such as associated with a label $D_\lambda$, for example. In an implementation, measurements associated with multiple labels, such as Label_1, Label_2, and so forth, may be included as many times in $D_\Lambda$ for which a particular asset has labels. For example, if a measurement is assigned 15 labels (e.g. Λ□15), for example, a possibility for 15 label normalization operations may be performed. In an embodiment, it may be noted that any number of labels may be assigned to a measurement, and claimed subject matter is not limited in this respect. As it pertains to a location associated with captured images, such as 210, 215, and 220, there is further described as $D_\lambda \triangleq \{d\}$, in which "d" comprises a label "λ" and may be represented by an ordered list of elements, such as $(l_h, l_w)$ which may contain a geographic location expressed by longitude $l_h$, and latitude $l_w$.

Scale-space theory, for example, which refers to a framework for multi-scale signal representation, may be employed in processing labeled measurements associated with a location. Thus, at 230, a histogram of a horizontal dimension "w" and of a vertical dimension "h" may be constructed. In one possible example, a discretized histogram may be expressed, for a label, such as Label_1, to captured images:

$$|D_\lambda| = \sum_{x=1}^{w} \sum_{y=1}^{h} f_\lambda(w, h) \qquad (1)$$

wherein, expression 1 expresses $D_\lambda$, for Label_1, Label_2, and so forth, producing in this example a two-dimensional density histogram $f_y(w,h)$. In at least one implementation, locations associated with labeled measurements may be represented using discrete increments of longitude and latitude. Accordingly, for increments of 0.01 degrees latitude, 36,000 discrete increments (w) are possible (360°/0.01°=36,000). Additionally, for increment sizes of 0.01 degrees longitude, 18,000 discrete increments (h) are possible (180°/0.01°=18,000). In the histogram illustrated at 230, grid points are shown at intersections of lines of constant "h" and lines of constant "w," for example.

At grid points of a histogram, such as illustrated at 230, which may number 36,000 (approximately) in a horizontal direction (w) and may number 18,000 (approximately) in a vertical direction (h), a linear scale-space representation of a family of increasingly smooth histograms $L_\lambda(w,h;t)$ for a given label (λ) may be described or computed as a convolution of $f_\lambda(w,h)$ with Gaussian kernels represented by G(w,h;t) may be described substantially in accord with expression 2, below as:

$$L_\lambda(w,h;t) = G(w,h;t) * f_\lambda(w,h) \qquad (2)$$

wherein, t denotes variance of a kernel, and operator "*" indicates a convolution operation. Process embodiment 20 may thus continue at 235 wherein kernel operations may be calculated and/or scaled so that Gaussian smoothing may be performed.

Returning briefly to 230, a bin of the illustrated histogram may be seen as varying in size. In an implementation, variance in histogram bin size may represent variations in measurement density for a nearby grid point. In one possible example, a larger bin may represent a correspondingly large number of labeled measurements near a popular attraction of New York, (e.g., Statue of Liberty). In this instance, a larger bin may indicate that a large number of labeled measurements corresponding to images captured at the Statue of Liberty may be represented as input signals to process embodiment 20.

In an illustrated histogram of 230, smaller bins, for example, may indicate that a lesser number of labeled measurements may be represented as input signals to process embodiment 20. For example, it may be reasonable to assume that somewhat fewer images may be captured at less popular locations within New York City, such as at locations along the banks of the East River. Likewise, bins of a histogram that appear to be blank or unpopulated may be indicative of locations at that do not correspond to locations at which any captured images are represented as inputs signals to process embodiment 20. It should be noted, however, that in other implementations, histogram bins represented at 230 may be constructed differently, such as by way of a grayscale, wherein darker shades of gray indicate higher density, and lighter shades of gray indicate lower density, as an example.

In an implementation, for a layer of higher resolution, computation of kernel functions for Gaussian smoothing, such as at 235, might not be performed and smoothing might not be used. Thus, while displaying a distribution of locations corresponding to labeled measurements, for example, an unfiltered or "raw" distribution of discretized locations may be displayed. Accordingly, at 240, it may be seen that for a layer t=0.0, at least in the facet shown in FIG. 2, discrete points of varying sizes may be displayed. Discrete points of varying sizes may, for example, indicate variations in density across a chosen axis, such as the x-axis (e.g. latitude) or the y-axis (e.g., longitude), for example. It should be noted that in other implementations, some level of smoothing may occur at layer t=0.0, and claimed subject matter is not limited in this respect.

In an embodiment, at subsequent layers, for example, based at least in part on kernel functions calculated at 235, effects of Gaussian smoothing across a chosen axis (such as longitude and/or latitude) may be seen at 240. At a layer t=1.0, it may be seen at 240 that discretized locations of relatively high density may be represented as a line segment that may result from a smoothing process. At layer t=2.0, it may be seen that a line segment present at layer t=1.0 is replaced by more gradual transitions and/or softer curves for an embodiment. Likewise, at a layer t=n, gradual transitions and/or softer curves shown at layer t=2.0 may be replaced by even more gradual transitions, reflecting an increased level of Gaussian smoothing that may occur as scale is increased, such as for an embodiment. However, again, it should be noted that contours illustrated at 240 merely describe one illustrative example implementation, such as Gaussian smoothing in a single dimension, for longitude or latitude. For example, an embodiment may include many dimensions, as previously mentioned.

In evaluating effects of smoothing at 240, similarities between 240 and FIGS. 1A-1C may be seen. At layer t=1.0, for example, relatively fine features of identified regions may be discernible. Thus, layer t=1.0 may correspond, at least in some implementations, to a one-dimensional portion or "slice" of FIG. 1C, in which relative fine features of identified region 100" may be distinguished, at a scale of 1.0 cm equals approximately 150.0 km, for example. Layer t=1.0 may thus correspond, at least in one possible example, to an identified region displaying locations of labeled measurements in relatively fine detail. However, again, commonality among features of 240 of FIG. 2 and FIGS. 1A-1C is merely illustrative, and claimed subject matter is not limited in this respect.

At layer t=2.0 of block 240, for example, less relatively fine features of identified regions may be discernible. Thus, layer t=2.0 may correspond, at least in some implementations, to a one dimensional portion of FIG. 1B, in which at least some features of identified region 100' may be distinguished, at a scale of 1.0 cm equals approximately 300.0 km. Likewise, at layer t=n shown at 240, for example, few features of identified regions may be discernible. Thus, layer t=n may thus correspond, at least in an example, to an identified region displaying locations of labeled measurements in relatively less detail, such as illustrated by region 100 of FIG. 1A, for example.

Returning to FIG. 2, at 245 conformance of at least one of Label_1 and Label_2 may be determined. In implementations, detecting conformance of a first label, such as Label_1, relative to a second label, such as Label_2, may permit selective display of certain regions identified by particular uniformity and/or conformance of labeled measurements. In one possible example, to illustrate, a tourism official may be interested in determining how many visitors to New York City actually capture images at the Statue of Liberty versus those who capture images at the East River. To enable such an investigation, captured images corresponding to locations within New York City may, for example, be assigned Label_1="Statue of Liberty." Other captured images, for example, may be assigned Label_2="East River." Accordingly, by comparing conformance of the two labels (e.g., "Statue of Liberty" vs. "East River") among a number of labeled measurements may provide insights to such an investigation. Further, displaying identified regions characterized by locations corresponding to captured images may, at least in part, allow visualization of identified regions associated with prominent labels, for example. It should be noted, however, that this is merely one example of a myriad of examples in which labels may be assigned to measurements to give rise to useful insights, such as using conformance and/or prominence among labels, as an example. Claimed subject matter is not limited in this respect.

In some implementations, it may be useful to emphasize a contribution of conforming labels in relation to a set comprising a larger group labels. For example, if 15 labels from a set of 100 labels are substantially identical, this may be expressed as a conformance parameter of 15/100. However, it may be useful to additionally employ a "prominence" parameter, as an enhancement of a conformance parameter, in an embodiment. In one example, a prominence parameter may be described in mathematical terms, substantially in accordance with expression 3, below:

$$L'_\lambda = \frac{(L_\lambda(w, h; t))^2}{L_\Lambda(w, h; t)} \quad (3)$$

wherein, prominence for a label measure at a particular grid point of histogram 230, for example, is given by $L'_\lambda$. $L_\lambda(w,h;t)$ expresses incidence of a particular label at a particular grid point, and $L_\Lambda(w,h;t)$ expresses a measure density at a particular grid point across labels, at least in one implementation. Of course, variable "t" represents a particular layer at which prominence is to be determined. In one possible example, a conformance parameter of 15/100 may be converted, in accordance with expression 3, for example, to a prominence parameter of 2.25. Accordingly, in one example, a 1.0% increase in the presence of a label, such as from 15.0% to 16.0%, may result in an increase in prominence of 2.25 to 2.56.

Conformance and/or prominence of labels associated with measurements may be determined on a per-layer basis in an embodiment, for example. In an implementation, detecting conformance and/or prominence on a per-layer basis may allow visualization of identified regions associated with particular labels at levels of scale appropriate to a layer and allow discarding measured labels associated with less conforming and/or less prominent labels, if desired. For example, a tourism official interested in determining interests of visitors of New York City may wish to study label conformance and/or prominence of labeled measurements on a city level, and may not be interested in tourism happenings at a state level. Accordingly, at a city level, labels, such as, for example, "Statue of Liberty" or other attractions may be of particular interest. In another example, a tourism official interested in determining interests of visitors to New York State, may, for example, be interested in label conformance of measurements at the state level, where prominent labels as "Poconos Mountains," or "Finger Lakes," may be emphasized while deemphasizing and/or discarding measurements having less prominent labels. However, other implementations may determine conformance and/or prominence based at least in part on criteria other than by a per layer basis, and claimed subject matter is not limited in this respect. Rather, this is merely one illustrative example.

In an implementation, a prominence parameter may be computed substantially according to expression 3, wherein a particular label, such as $L_\lambda(w, h; t)$ is squared (e.g., $(L_\lambda(w, h; t))^2$) to emphasize its contribution in relation to occurrence of other labels in a given layer (t), such as $L_A(w,h;t)$. Although expression 3 indicates that an emphasis, such as prominence, may be computed using a square of contribution of a particular label, operations other than squaring the numerator of expression 3 may be performed in other computations to nonetheless provide a numerical measure of emphasis. For example, in lieu of squaring the numerator, the numerator may be raised to a power of, for example, 1.5. In other implementations, exponents greater than 2.0 may be employed, such as 2.1, 2.5, and so forth. Further, in some implementations, variations of expression 3 may be employed in which the numerator of expression 3 need not be exponentiated. Claimed subject matter is intended to embrace any mathematical operation to obtain emphasis of a first label relative to a second label, for example.

In an implementation, conformance and/or prominence may be used to identify sub-regions within identified regions having particular levels of conformance and/or prominence. For example, a first iso-contour may identify a sub-region within which a conformance parameter of at least 15/100 with respect to a particular label may be present. A second iso-contour, for example, may identify a sub-region within which a conformance parameter of at least 25/100 with respect to a particular label may be present. Likewise, iso-contours may identify sub-regions within which prominence parameters with respect to a particular label, such as greater than 2.25, greater than 2.56, and so forth, may be present.

Reference number 250 of FIG. 2 may include use of a spatial bandpass filter that serves to filter or to at least limit a contribution of spatial frequencies that may be inappropriate for a level of scale for an identified region being displayed. In this context, the term spatial frequency refers to a spatial domain measure of irregularity and/or undulation in a number of occurrences. For example, in FIG. 1A, it can be seen that relatively fine details present at, for example, FIG. 1B or FIG. 1C are removed or omitted. Thus, for example, in the event that a researcher is interested in high-level trends, such as the occurrence of droughts across the continental United States, it may be appreciated that details presented pertain more to high-level contours rather than to relatively fine details. Likewise, a researcher studying a particular drought in the San Joaquin Valley of California (FIG. 1B), may be interested in identified regions encompassed by a drought, and may be less interested in those locations within the San Joaquin Valley corresponding to measurements labeled with "severe drought," for example.

In mathematical terms, at least for an implementation, spatial filtering may be expressed in expression 4 substantially as follows:

$$\text{Filter output} = \begin{cases} 1 & \text{if } L_\lambda(w, h; t) - L_\lambda(w, h; t+a) > \varepsilon \\ 0 & \text{otherwise} \end{cases} \quad (4)$$

wherein $L_\lambda(w, h; t)$ expresses occurrence of measurements associated with a particular label at a particular grid point (w, h) for a layer "t." $L_\lambda(w, h; t+a)$ expresses occurrence of measurements associated with a particular label at a particular point (w, h), at a slightly higher layer of t+a. A residual "E" indicates a measure of "visual noise" and/or "jitter" that is to be tolerated.

In an implementation, selection of variable "a" used in a difference (e.g., bandpass filtering) operation, such as expression 4 may approach zero. In this instance, expression 4 may closely approximate the Laplacian of the Gaussian, which may effectively detect edges between two areas of relatively uniform, but different, intensities in a histogram, such as histogram 230, although, likewise, other methods may also be used. In some instances, variable "a" may comprise a somewhat larger numeral, and claimed subject matter is intended to embrace implementations in which "a" may approach zero as well as those for which "a" may approximate larger values. In implementations, for example, layers t=4.0, t=16.0, t=64.0 and so forth may be used. Variable "a" may comprise values such as 5.0, 10.0, 15.0, or larger and/or may be expressed as a function of t, for example.

At 255, one or more image processing techniques may be used to form boundaries of identified regions characterized by labeled measurements. In an implementation, use of image processing techniques corresponding to morphological transforms, such as filling, closing, contour tracing, dilation, erosion, and/or other operations, either alone or in combination, may provide visually meaningful shaping as well as removal of details that may not be appropriate or consistent with a given layer. In one example, returning briefly to FIGS. 1A-1C, identified 112, 114, 116, and 118, visible in FIG. 1B, and which span and/or encompass regions on the order of 100.0 km, are not visible in identified region 100 of FIG. 1A, for which 100.0 km may be approximately equal 1/10 of a centimeter. Thus, while viewing FIG. 1A, which may represent a layer corresponding to a scale having relatively low resolution among FIGS. 1A-1C, a user need not be distracted by relatively fine details that may be relatively uninteresting if viewed at a layer showing a continent, for example.

Image processing techniques, such as morphological filling, which may, for example, emphasize spatial extent of a label measure rather than density, may be achieved by contour tracing a binary representation to extract outer contours that may mark or designate areas where influence of a label measure may drop below a threshold, for example. If outer contours of an identified region may be discerned, areas enclosed by outer contours may be filled, such as by identified region 100, as in FIG. 1A. Likewise, identified regions 113, 117, 115, and 119, for example, are visible in FIG. 1C, but are filled by surrounding identified regions 112', 116', 114', and 118', respectively, in FIG. 1B. However, operations and/or processing may also be achieved through other techniques, and claimed subject matter is not limited in this respect.

Figure 3:
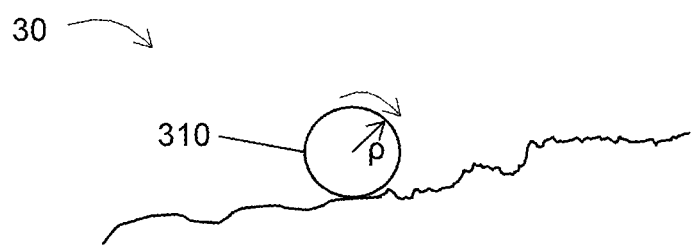
FIG. 3 shows a disk-shaped structuring component as may be used in contour smoothing according to an embodiment.

Image processing techniques employed at 255 may also include morphological closing. For example, returning to FIG. 1C, identified regions 126 may be seen as slightly detached from identified region 116'. Similarly, identified region 127 may be seen as slightly detached from identified region 100". In at least certain implementations, detail may be of a reduced relative signal value while identified region 100 may be viewed with lower resolution, such as in FIG. 1B, to show identified region 100'. To remove identified regions 126 and 127, morphological closing may be employed in which disjointed or detached features are separated from an identified region by a small gap, for example, so as to close the gap. Morphological closing may be implemented in an embodiment by performing a dilation operation followed by an erosion operation. In a dilation and/or erosion operation, a disk-shaped structuring element "S" may be used to form a binary representation of an identified region. Mathematically, this may be expressed substantially in accordance with expression 5 below:

$$b(w,h;t) \cdot S = (b(w,h;t) \oplus S) \ominus S \qquad (5)$$

wherein $b(w,h;t)$ of expression 5 denotes a binary representation of an identified region, and wherein "S" denotes a disk-shaped structuring element having a radius "ρ" selected substantially according to a desired smoothing, as illustrated in FIG. 3. In the example of FIG. 3, disk 310 having radius ρ may be selected substantially according to a particular scale, as influenced by a particular layer, such as t=2.0, t=3.0, and so forth. In an implementation, for layers in which a greater level of detail is desired, such as layer t=1.0, for example, a disk of a smaller radius "ρ" may be appropriate, resulting in less smoothing of an outer contour. For layers in which a lesser relative level of detail is desired, such as layer t=5.0, a disk of a larger radius "ρ" may be appropriate, resulting in greater relative smoothing of an outer contour.

Figure 4A:
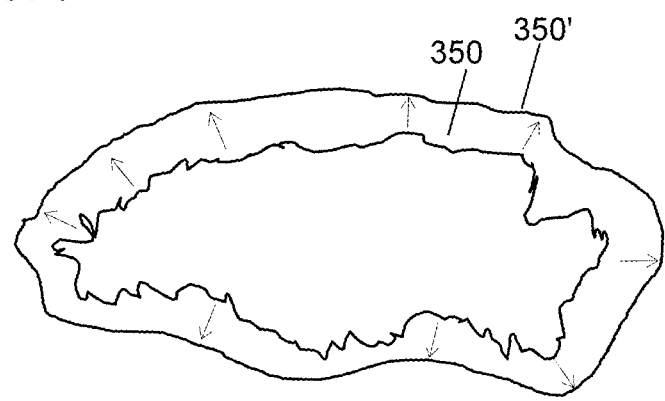
FIGS. 4A and 4B show additional image processing that may be used to form one or more identified regions according to an embodiment.
Figure 4B:
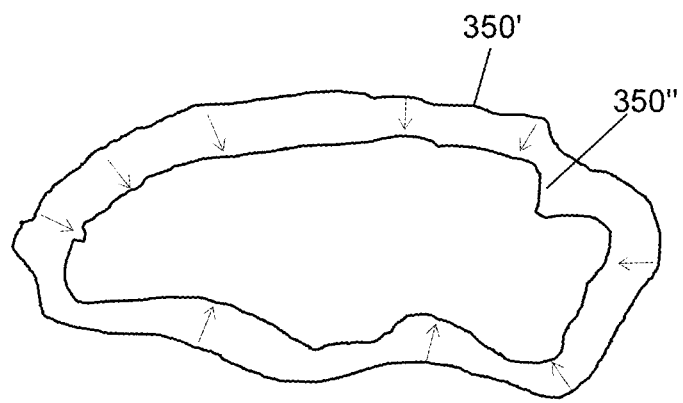

FIGS. 4A and 4B show additional image processing techniques that may be used to assist in forming an identified region according to an embodiment. In FIG. 4A, embodiment 40 shows identified region 350 in a dilated state, which may reduce relative detail in outer contours. Dilation of identified region 350 results, at least in part, in dilated identified region 350'. In FIG. 4B, dilated identified region 350' is eroded to form identified region 350", comprising much less relative detail than identified region 350 shown in FIG. 4A.

Image processing techniques referenced in descriptions of FIGS. 3, 4A, and 4B represent just a few of many possible techniques that may be utilized to identify regions from a binary representation of an identified region, such as given by $b(w,h;t)$ of expression 5, in an embodiment. For example, a morphological closing operation, as described with reference to FIG. 3, may be performed by one or more dilation/erosion operations, such as described with reference to FIGS. 4A, and 4B, for example. In another example, morphological filling, such as previously described herein, may be substituted for, or performed in addition to, a flood filling operation, that, for example, may skip inner (nested) contours, such as identified regions 113, 117, 115, and 119 of FIG. 1C. It is contemplated that claimed subject matter embraces any of a host of possible image-processing techniques, such as, for example, technique to process contours of identified region boundaries.

Figure 5:
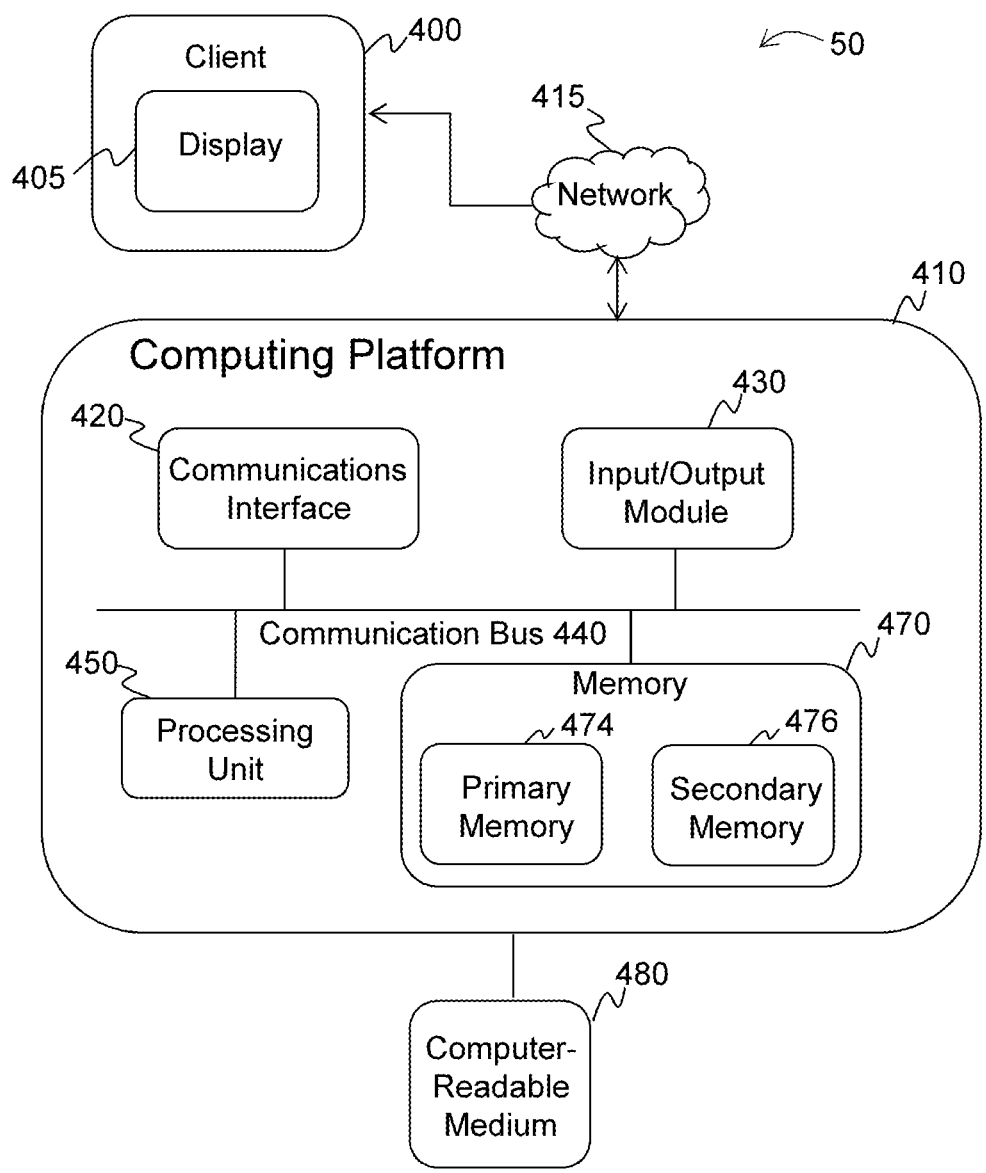
FIG. 5 is a schematic diagram of a system that may be employed for identifying one or more regions characterized by labeled measurements according to an embodiment.

For purposes of illustration, FIG. 5 is an illustration of an embodiment of a computing platform or computing device 410 that may be employed in a client-server type interaction, such as described infra. In FIG. 5, a server may interface with a client 400 or 410, which may comprise features of a conventional client device, for example. Communications interface 420, processor (e.g., processing unit) 450, and memory 470, which may comprise primary memory 474 and secondary memory 476, may communicate by way of communication bus 440, for example. In FIG. 5, client 410 may store various forms of content, such as analog, uncompressed digital, lossless compressed digital, or lossy compressed digital formats for content of various types, such as video, imaging, text, audio, etc. in the form physical states or signals, for example. Client 410 may communicate with a server by way of an Internet connection via network 415, for example. Although the computing platform of FIG. 5 shows the above-identified components, claimed subject matter is not limited to computing platforms having only these components as other implementations may include alternative arrangements that may comprise additional components, fewer components, or components that function differently while achieving similar results. Rather, examples are provided merely as illustrations. It is not intended that claimed subject matter to limited in scope to illustrative examples.

Processor 450 may be representative of one or more circuits, such as digital circuits, to perform at least a portion of a computing procedure or process. By way of example but not limitation, processor 450 may comprise one or more processors, such as controllers, microprocessors, microcontrollers, application specific integrated circuits, digital signal processors, programmable logic devices, field programmable gate arrays, and the like, or any combination thereof. In implementations, processor 450 may perform signal processing to manipulate signals or states or to construct signals or states, for example.

Memory 470 may be representative of any storage mechanism. Memory 470 may comprise, for example, primary memory 474 and secondary memory 476, additional memory circuits, mechanisms, or combinations thereof may be used. Memory 470 may comprise, for example, random access memory, read only memory, or one or more data storage devices or systems, such as, for example, a disk drive, an optical disc drive, a tape drive, a solid-state memory drive, just to name a few examples. Memory 470 may be utilized to store a program, as an example. Memory 470 may also comprise a memory controller for accessing computer readable-medium 480 that may carry and/or make accessible content, code, and/or instructions, for example, executable by processor 450 or some other controller or processor capable of executing instructions, for example.

Under the direction of processor 450, memory, such as cells storing physical states, representing for example, a program, may be executed by processor 450 and generated signals may be transmitted via a network, such as the Internet, for example. Processor 450 may also receive digitally encoded signals from server 400.

Network 415 may comprise one or more communication links, processes, and/or resources to support exchanging communication signals between a client and server, which may, for example, comprise one or more servers (not shown). By way of example, but not limitation, network 415 may comprise wireless and/or wired communication links, telephone or telecommunications systems, Wi-Fi networks, Wi-MAX networks, the Internet, the web, a local area network (LAN), a wide area network (WAN), or any combination thereof.

The term "computing platform," as used herein, refers to a system and/or a device, such as a computing device, that includes a capability to process and/or store data in the form of signals and/or states. Thus, a computing platform, in this context, may comprise hardware, software, firmware, or any combination thereof (other than software per se). Computing platform 410, as depicted in FIG. 5, is merely one such example, and the scope of claimed subject matter is not limited to this particular example. For one or more embodiments, a computing platform may comprise any of a wide range of digital electronic devices, including, but not limited to, personal desktop or notebook computers, high-definition televisions, digital versatile disc (DVD) players and/or recorders, game consoles, satellite television receivers, cellular telephones, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing platform.

Memory 470 may store cookies relating to one or more users and may also comprise a computer-readable medium that may carry and/or make accessible content, code and/or instructions, for example, executable by processor 450 or some other controller or processor capable of executing instructions, for example. A user may make use of an input device, such as a computer mouse, stylus, track ball, keyboard, or any other device capable of receiving an input from a user.

Regarding aspects related to a communications or computing network, a wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, and/or the like, which may move freely, randomly or organize themselves arbitrarily, such that network topology may change, at times even rapidly. Wireless network may further employ a plurality of network access technologies, including Long Term Evolution (LTE), WLAN, Wireless Router (WR) mesh, or 2nd, 3rd, or 4th generation (2G, 3G, or 4G) cellular technology, or other technologies, or the like. Network access technologies may enable wide area coverage for devices, such as client devices with varying degrees of mobility, for example.

A network may enable radio frequency or wireless type communications via a network access technology, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or other, or the like. A wireless network may include virtually any type of now known, or to be developed, wireless communication mechanism by which signals may be communicated between devices, such as a client device or a computing device, between or within a network, or the like.

Communications between a computing device and a wireless network may be in accordance with known, or to be developed cellular telephone communication network protocols including, for example, global system for mobile communications (GSM), enhanced data rate for GSM evolution (EDGE), and worldwide interoperability for microwave access (WiMAX). A computing device may also have a subscriber identity module (SIM) card, which, for example, may comprise a detachable smart card that stores subscription information of a user, and may also store a contact list of the user. A user may own the computing device or may otherwise be its primary user, for example. A computing device may be assigned an address by a wireless or wired telephony network operator, or an Internet Service Provider (ISP). For example, an address may comprise a domestic or international telephone number, an Internet Protocol (IP) address, and/or one or more other identifiers. In other embodiments, a communication network may be embodied as a wired network, wireless network, or combination thereof.

A computing device may vary in terms of capabilities or features. Claimed subject matter is intended to cover a wide range of potential variations. For example, a network device may include a numeric keypad or other display of limited functionality, such as a monochrome liquid crystal display (LCD) for displaying text. In contrast, however, as another example, a web-enabled computing device may include a physical or a virtual keyboard, mass storage, one or more accelerometers, one or more gyroscopes, global positioning system (GPS) or other location-identifying type capability, and/or a display with a higher degree of functionality, such as a touch-sensitive color 2D or 3D display, for example.

A computing device may include or may execute a variety of now known, or to be developed operating systems, or derivatives and/or versions, including personal computer operating systems, such as a Windows, iOS or Linux, or a mobile operating system, such as iOS, Android, or Windows Mobile, or the like. A computing device may include or may execute a variety of possible applications, such as a client software application enabling communication with other devices, such as communicating one or more messages, such as via email, short message service (SMS), or multimedia message service (MMS), including via a network, such as a social network including, but not limited to, Facebook, LinkedIn, Twitter, Flickr, or Google+, to provide only a few examples. A computing device may also include or execute a software application to communicate content, such as, for example, textual content, multimedia content, or the like. A computing device may also include or execute a software application to perform a variety of possible tasks, such as browsing, searching, playing various forms of content, including locally stored or streamed video, or games such as, but not limited to, fantasy sports leagues. The foregoing is provided merely to illustrate that claimed subject matter is intended to include a wide range of possible features or capabilities.

A network including a computing device, for example, and may also be extended to another device communicating as part of another network, such as via a virtual private network (VPN). To support a VPN, transmissions may be forwarded to the VPN device. For example, a software tunnel may be created. Tunneled traffic may, or may not be encrypted, and a tunneling protocol may be substantially complaint with or substantially compatible with any past, present or future versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, or another existing protocol, or another protocol that may be developed.

A network may be compatible with now known, or to be developed, past, present, or future versions of any, but not limited to the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, or X.25. A network may employ, for example, TCP/IP, UDP, DECnet, NetBEUI, IPX, Appletalk, other, or the like. Versions of the Internet Protocol (IP) may include IPv4, IPv6, other, and/or the like.

It will, of course, be understood that, although particular embodiments will be described, claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example (other than software per se). Likewise, although claimed subject matter is not limited in scope in this respect, one embodiment may comprise one or more articles, such as a storage medium or storage media. Storage media, such as, one or more CD-ROMs and/or disks, for example, may have stored thereon instructions, executable by a system, such as a computer system, computing platform, or other system, for example, that may result in an embodiment of a method in accordance with claimed subject matter being executed, such as a previously described embodiment, for example; although, of course, claimed subject matter is not limited to previously described embodiments. As one potential example, a computing platform may include one or more processing units or processors, one or more devices capable of inputting/outputting, such as a display, a keyboard and/or a mouse, and/or one or more memories, such as static random access memory, dynamic random access memory, flash memory, and/or a hard drive.

In the preceding detailed description, numerous specific details have been set forth to provide a thorough understanding of claimed subject matter. However, it will be understood by those skilled in the art that claimed subject matter may be practiced without these specific details. In other instances, methods and/or apparatuses that would be known by one of ordinary skill have not been described in detail so as not to obscure claimed subject matter. Some portions of the preceding detailed description have been presented in terms of logic, algorithms, and/or symbolic representations of operations on binary signals or states, such as stored within a memory of a specific apparatus or special purpose computing device or platform. In the context of this particular specification, the term specific apparatus or the like includes a general-purpose computing device, such as general-purpose computer, once it is programmed to perform particular functions pursuant to instructions from program software.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involves physical manipulation of physical quantities. Typically, although not necessarily, such quantities may take the form of electrical and/or magnetic signals and/or states capable of being stored, transferred, combined, compared, processed or otherwise manipulated as electronic signals and/or states representing information. It has proven convenient at times, principally for reasons of common usage, to refer to such signals and/or states as bits, data, values, elements, symbols, characters, terms, numbers, numerals, information, and/or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing device. In the context of this specification, therefore, a special purpose computer and/or a similar special purpose computing device is capable of processing, manipulating and/or transforming signals and/or states, typically represented as physical electronic and/or magnetic quantities within memories, registers, and/or other information storage devices, transmission devices, and/or display devices of the special purpose computer and/or similar special purpose computing device. In the context of this particular patent application, as mentioned, the term "specific apparatus" may include a general-purpose computing device, such as a general-purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

While there has been illustrated and/or described what are presently considered to be example features, it will be understood by those skilled in the relevant art that various other modifications may be made and/or equivalents may be substituted, without departing from claimed subject matter. Additionally, many modifications may be made to adapt a particular situation to the teachings of claimed subject matter without departing from one or more central concept(s) described herein. Therefore, it is intended that claimed subject matter not be limited to the particular examples disclosed, but that such claimed subject matter may also include all aspects falling within appended claims and/or equivalents thereof.

The invention claimed is:

1. An apparatus, comprising:
one or more processors, coupled to a memory, to:
construct a variety of histograms from a set of labeled measurements at a corresponding variety of scale levels; and
smooth at least some of the variety of histograms, the smoothing to be increased responsive to a command from a user interface to decrease resolution of a displayed map to be generated from the variety of histograms.

2. The apparatus of claim 1, wherein the one or more processors is additionally to:
decrease smoothing of at least one of the variety of histograms responsive to a command from the user interface to increase resolution of the displayed map to be generated from the variety of histograms.

3. The apparatus of claim 1, wherein the one or more processors is additionally to:
identify at least one label region boundary at the variety of scale levels.

4. The apparatus of claim 3, wherein the identifying of at least one label region boundary to comprise an identification of one or more sub-regions to be characterized by prominent labels of the set of labeled measurements.

5. The apparatus of claim 3, wherein the one or more processors is additionally to:
employ an image processing technique to assist in a formation of the at least one label region boundary, the image processing technique to comprise one or more of the following: filling, closing, contour tracing, dilation, erosion, or any combination thereof.

6. The apparatus of claim 1, wherein the one or more processors is additionally to:
smooth at least some of the variety of histograms to identify iso-contours at the variety of scale levels.

7. The apparatus of claim 6, wherein to identify the iso-contours at the variety of scale levels is at least partially in response to a construction of the variety of histograms from the set of labeled measurements.

8. The apparatus of claim 1, wherein to smooth the at least some of the variety of histograms to comprise:
utilization of a Gaussian function to have a kernel size consistent with the set of labeled measurements at the variety of scale levels.

9. The apparatus of claim 1, wherein the set of labeled measurements comprise labels to be assigned to captured images.

10. The apparatus of claim 1, wherein to smooth the at least some of the variety of histograms to comprise utilization of a spatial bandpass filter to filter spatial frequencies between at least two scale levels of the variety of scale levels.

11. The apparatus of claim 10, wherein the utilization of the spatial bandpass filter to scale the set of labeled measurements from a current to a different level in response to a receipt of a zoom command from the user interface.

12. A method comprising:
constructing a variety of histograms from a set of labeled measurements at a corresponding variety of scale levels; and
smoothing at least some of the variety of histograms, wherein smoothing is decreased responsive to a command from a user interface to increase resolution of a displayed map generated from the variety of histograms.

13. The method of claim 12, further comprising:
increasing smoothing responsive to a command from the user interface to decrease resolution of the displayed map generated from the variety of histograms.

14. The method of claim 12, further comprising:
identifying at least one label region boundary at the variety of scale levels.

15. The method of claim 14, wherein the identifying of at least one label region boundary comprises identifying one or more label region boundaries of sub-regions characterized by prominent labels of the set of labeled measurements.

16. The method of claim 14, further comprising:
employing an image processing technique to assist in forming the at least one label region boundary, the image processing technique comprising one or more of the following: filling, closing, contour tracing, dilation, erosion, or any combination thereof.

17. The method of claim 12, further comprising smoothing at least some of the variety of histograms to identify iso-contours at the variety of scale levels.

18. An apparatus, comprising:
means for constructing a variety of histograms from a set of labeled measurements at a corresponding variety of scale levels;
means for smoothing at least some of the variety of histograms, the smoothing to be increased responsive to a command from a user interface to decrease resolution of a map generated from the variety of histograms; and
means for displaying the map generated from the variety of histograms.

19. The apparatus of claim 18, further comprising:
means for employing an image processing technique to assist in forming at least one label region boundary displayed by the means for displaying the map generated from the variety of histograms, the image processing technique comprising one or more of the following: filling, closing, contour tracing, dilation, erosion, or any combination thereof.

20. The apparatus of claim 19, wherein the means for employing an image processing technique comprises means for employing a Gaussian function having a kernel size consistent with the set of labeled measurements at the variety of scale levels.

* * * * *